BLANKING CIRCUITS FOR TELEVISION RECEIVERS

Original Filed April 5, 1965 3 Sheets-Sheet 1

INVENTORS
THOMAS ANTHONY ZIMMERMAN &
BY THOMAS W. BURRUS
Eugene M. Whitacre
Attorney

BLANKING CIRCUITS FOR TELEVISION RECEIVERS

Original Filed April 5, 1965 3 Sheets-Sheet 2

INVENTORS
THOMAS ANTHONY ZIMMERMAN
THOMAS W. BURRUS
BY Eugene M. Whitacre
Attorney

BLANKING CIRCUITS FOR TELEVISION RECEIVERS

Original Filed April 5, 1965 3 Sheets-Sheet 3

INVENTORS
THOMAS ANTHONY ZIMMERMAN &
BY THOMAS W. BURRUS
Eugene M. Whitacre
Attorney United States Patent Office Re. 27,793
Reissued Oct. 30, 1973

27,793
BLANKING CIRCUITS FOR TELEVISION RECEIVERS

Thomas W. Burrus, Torrance, Calif., assignor to RCA Corporation

Original No. 3,436,475, dated Apr. 1, 1969, Ser. No. 445,451, Apr. 5, 1965. Application for reissue Jan. 7, 1970, Ser. No. 1,221
Int. Cl. H04n *3/24*
U.S. Cl. 178—7.5 R 7 Claims

Matter enclosed in heavy brackets [ ] appears in the original patent but forms no part of this reissue specification; matter printed in italics indicates the additions made by reissue.

ABSTRACT OF THE DISCLOSURE

Retrace blanking in a television receiver is achieved by the application of a pulse to a pulse amplifier, the output of which is coupled to the input of a video amplifier stage. The pulse amplifier is suitably biased relative to the magnitude and rate of decay of the applied pulse such that the pulse output therefrom is predetermined to coincide with and have a time duration substantially equal to the retrace interval.

This invention relates to television receivers, and in particular to vertical retrace blanking circuits for use in color receivers.

Blanking circuits are employed to turn off or blank the deflection beam of a television receiver kinescope during retrace periods of the beam. If the deflection beam is not suppressed during its vertical retrace movement, vertical retrace lines will appear on the screen of the kinescope. In a black and white receiver, these lines appear as white diagonal lines across the raster. In a color receiver the lines may appear in spurious colors and as such effect the color balance of the visual image. In order to prevent, to a certain extent, the appearance of vertical retrace lines, the transmitted composite television video signal contains vertical blanking information. However, this does not insure the elimination of visible retrace lines, because such lines will appear if the brightness control is not correctly adjusted and the electron beam is of sufficient intensity during retrace to produce such lines. To minimize the possibility of retrace lines appearing, it has been the practice in the past to employ retrace suppression, utilizing the flyback pulses of the vertical deflection circuit as suppression pulses. In a vertical deflection circuit a composite voltage is produced having a sawtooth component and a pulse (flyback) component. The sawtooth component is removed by applying the composite voltage through a resistance-capacitance differentiating network, and then the remaining pulse component is supplied to a beam intensity control electrode of the receiver kinescope to suppress the appearance of retrace lines on the screen of the kinescope during the vertical retrace interval. It has been found, that for color receivers, these suppression pulses may not be of sufficient amplitude during the retrace time interval to provide adequate blanking or suppression of the vertical retrace lines, and as a result the retrace lines may still be visible on portions of the kinescope screen.

Accordingly, it is an object of the present invention to provide an improved circuit for obtaining vertical retrace blanking of the kinescope of a television receiver.

It is another object of the present invention to provide an improved circuit for obtaining complete vertical retrace blanking of the kinescope of a color television receiver during the vertical retrace interval.

Vertical retrace blanking in a color television receiver is provided, in accordance with the invention, by deriving a pulse signal from the vertical deflection circuit of the receiver during the retrace interval of the vertical deflection cycle. This pulse is properly shaped, amplified and applied through a switching device to the input of a video amplifier so as to additively combine with the detected composite television video signal also present at the input of the video amplifier. The addition of the pulse to the detected composite television video signal raises said signal to a level above the "blacker than black" modulation voltage level during the vertical retrace interval of the deflection cycle, and thus provides blanking of the beam of the kinescope during vertical retrace.

The novel features that are considered characteristic of this invention are set forth with particularity in the appended claims. The invention itself, however, both as to its organization and method of operation will best be understood when read in connection with the accompanying drawing, in which:

Figure 1:
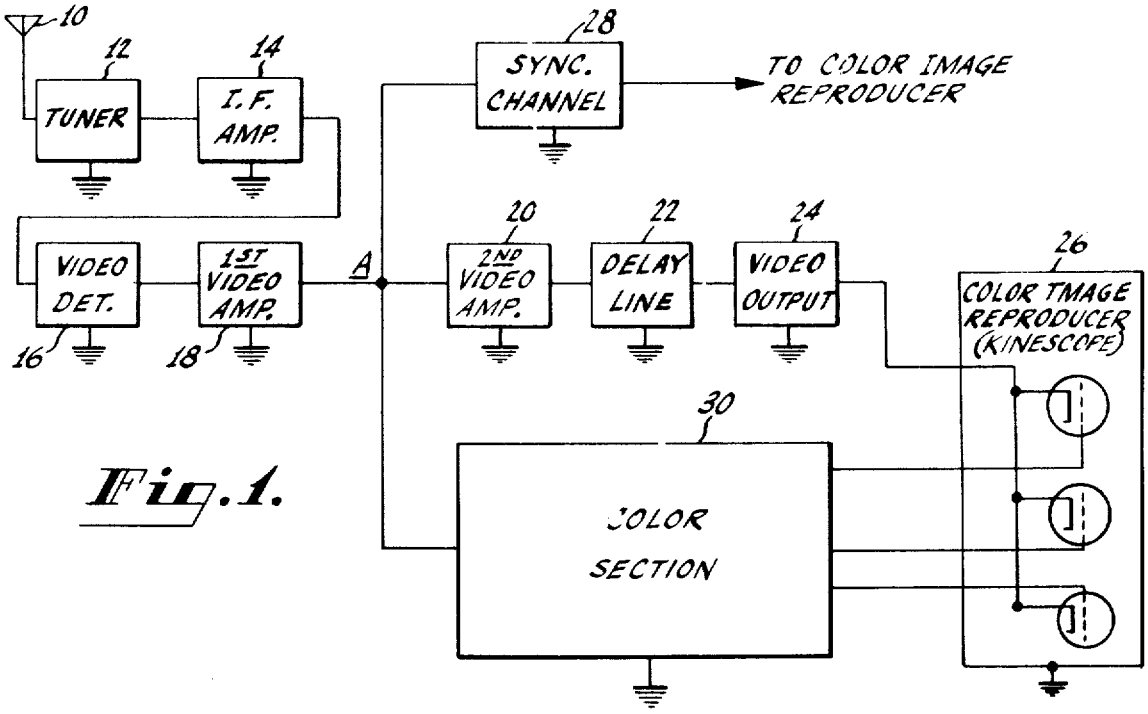
FIGURE 1 is a block diagram of a portion of a color television receiver.

Referring now to the drawings, wherein like parts are indicated by like reference numerals in all figures, and referring in particular to FIGURE 1, a color television receiver includes an antenna 10, for receiving a carrier wave modulated by a composite video signal, which is coupled to apply the received wave to a tuner 12. The tuner 12 may include, as is known, a radio frequency amplifier and a frequency converter for converting the radio frequency signal to an intermediate frequency signal. The intermediate frequency signal derived from the tuner 12 is amplified by an intermediate frequency amplifier 14 and applied to a video detector stage 16 which is operative to recover the composite video signal from the intermeidate frequency signal.

The composite video signal derived from the detector 16 is directly coupled to a first video amplifier 18. The output of the first video amplifier 18, comprising an amplified and phase inverted version of the detector output, appears at a common amplifier output terminal A and is directly coupled to a positively biased second video amplifier 20. The output of the second video amplifier 20 is coupled through a delay line 22 to a video output stage 24 and then to the cathode of a kinescope or color image reproducer 26.

The output of the first video amplifier 18 is also applied to a sync channel 28 and to a color section 30 of the receiver for processing of the component parts of the color television video signal to effect a visual display of the color picture information portion on the screen of the kinescope 26 in accordance with known techniques.

For example, the synch channel 28 serves to separate the deflection synchronizing components from the composit video signal in accordance with well-known amplitude selective techniques. These separated deflection synchronizing components are applied to vertical and horizontal deflection circuits to synchronize the development therein of suitable vertical and horizontal deflecting waveforms having a relatively long scanning portion and a relatively short retrace portion for application to the appropriate deflecting elements of the color image reproducer 26. The color section 30 includes a chrominance amplifier, burst amplifier, color demodulators, and other circuitry well known in the art to detect and synchronize the color information portion of the composite video signal and then apply said color information to appropriate grids of the kinescope 26.

The circuit components and configuration of the previously mentioned tuner 12, intermediate frequency amplifier 14, video detector 16, first video amplifier 18, second video amplifier 20, delay line 22, video output stage 24, kinescope 26, sync channel 28, and color section 30, may conform to the details of the corresponding elements of the RCA CTC 17 color television receiver chassis (described in the RCA Service Data pamphlet 1964 No. T12).

Figure 2:
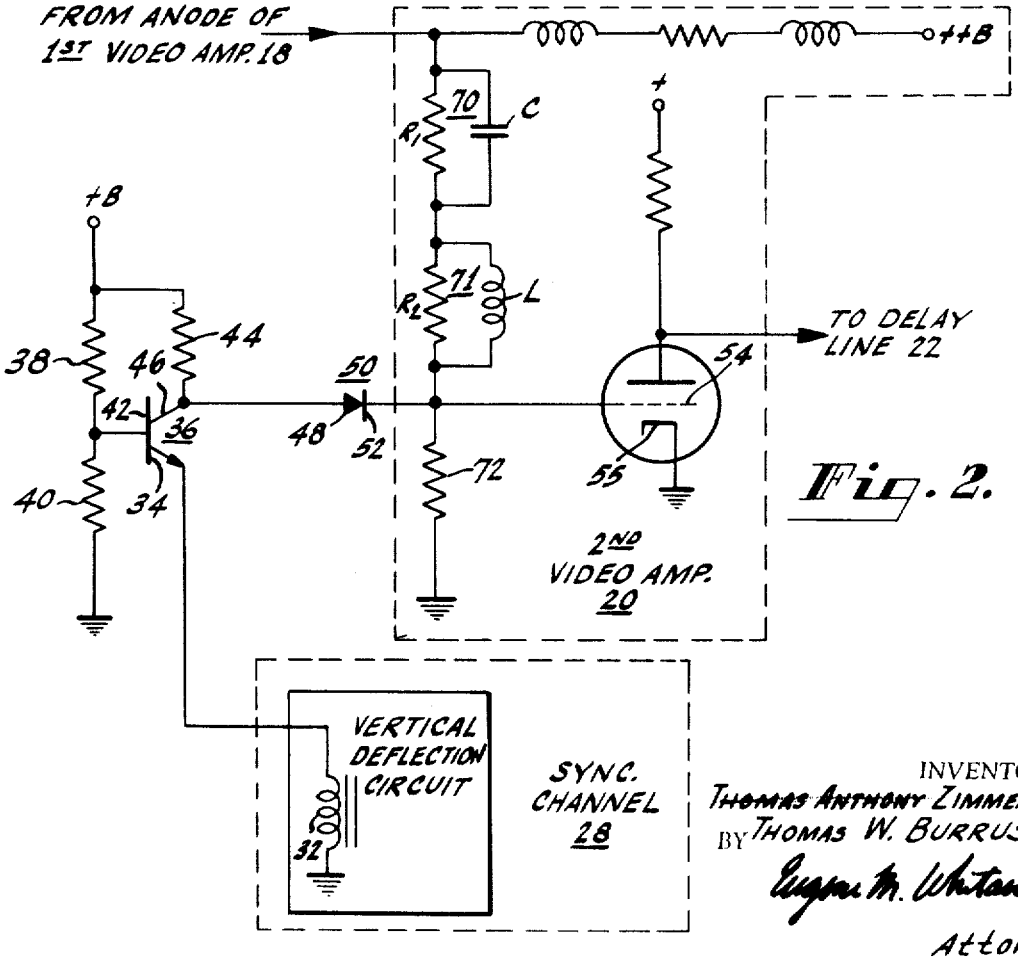
FIGURE 2 illustrates schematically the circuit details of an embodiment of the present invention as applied to the receiver shown in FIGURE 1.

In accordance with an embodiment of the invention and referring particularly to FIGURE 2, the vertical deflection circuit of the sync channel 28 includes an output transformer in the vertical deflection circuit having a winding 32 across which is developed a positive pulse during the interval of the retrace portion of the vertical deflection waveform. A connection is provided between winding 32 and the emitter electrode 34 of a transistor 36 to couple the retrace pulse thereto for shaping and amplification as will be hereinafter described.

The transistor 36 is initially forward biased to saturation for conduction during the time interval when the retrace pulse is not presented to the emitter electrode 34. The biasing arrangement may comprise resistors 38 and 40 respectively connected from the base electrode 42 of transistor 36 to a positive voltage source +B and a reference or ground potential. A load resistor 44 is connected between the collector electrode 46 of transistor 36 and the source of positive voltage +B as shown in FIGURE 2.

The composite video signal amplified by the first video amplifier 18 is developed across a parallel $R_1$–C network 70, a parallel $R_2$–L network 71 and a resistor 72 connected in series between the output of the first video amplifier and ground. The output of the first video amplifier stage 18 is also connected through a pair of inductors and a resistor to a source of operating potential ++B of greater magnitude than the potential source +B connected with the transistor 36. That portion of the video signal output voltage developed across the resistor 72 is directly applied between the grid 54 and cathode 55 of the second video amplifier 20. It will be noted that the voltage divider action of the networks 70 and 71, and the resistor 72 cause the grid 54 of the second video amplifier stage 20 to be positively biased relative to ground.

A diode 50 is serially connected between the grid 54 of the second video amplifier 20 and the collector 46 of the transistor 36. The diode is poled such that the anode 48 thereof is connected to the collector 46, and its cathode 52 is connected with the grid 54. During the normal field interval the voltage developed across the resistor 72 is sufficiently more positive than the voltage developed at the collector 46 so that the diode 50 is reversed biased and hence presents a high impedance to isolate the blanking circuit from the second video amplifier stage 20.

In the illustrated embodiment, it is assumed that the video detector 16 (FIGURE 1) is poled to detect the negative envelope of the composite video signal. As hereinbefore stated, the first video amplifier 18 effects a phase inversion of the signals applied thereto so that the composite video signal is applied to the control grid 54 of the second video amplifier 20 with a sync pulse excursion in the positive direction.

When a positive retrace pulse is applied to the emitter electrode 34 of the transistor 36, the transistor forward bias is overcome, and the transistor is driven into cutoff, causing the collector voltage to rise rapidly and overcome the diode reverse bias. The rising collector voltage is then coupled through the diode 50 to the control grid 54 of the second video amplifier 20, where it additively combines with and reinforces the vertical sync pulse portion of the composite video signal applied to the control grid from the first video amplifier 18. The magnitude of the collector voltage presented to the control grid 54 of the second video amplifier 20 is determined by the division of the transistor +B supply voltage between the load resistor 44 and the D-C input impedance of the second video amplifier 20.

When the retrace pulse has decayed to a point where the forward bias on the transistor 36 again takes control, the transistor conducts and its collector voltage drops below the positive D-C bias level, developing a reverse bias on the diode 50 which blocks any further transmission of the collector 46 voltage to the control grid 54. The time interval during which the collector voltage is applied to the control grid 54 is determined by the values of the base biasing resistors 38 and 40, as well as the transistor characteristics, the magnitude and rate of decay of the retrace pulse, and the reverse bias on the diode 50. Thus, by proper choice of circuit component values, the transistor 36 can be caused to gate a relatively large positive D-C voltage pulse to the control grid 54 of the second video amplifier 20 during a time interval substantially coinciding with that in which the vertical sync pulse portion of the composite video signal is applied thereto. This voltage pulse enhances the vertical sync pulse portion of the composite video signal and raises it to a level well above the level corresponding to a "blacker than black" modulation voltage, so as to provide complete blanking of the kinescope during the vertical retrace time interval.

Figure 3:
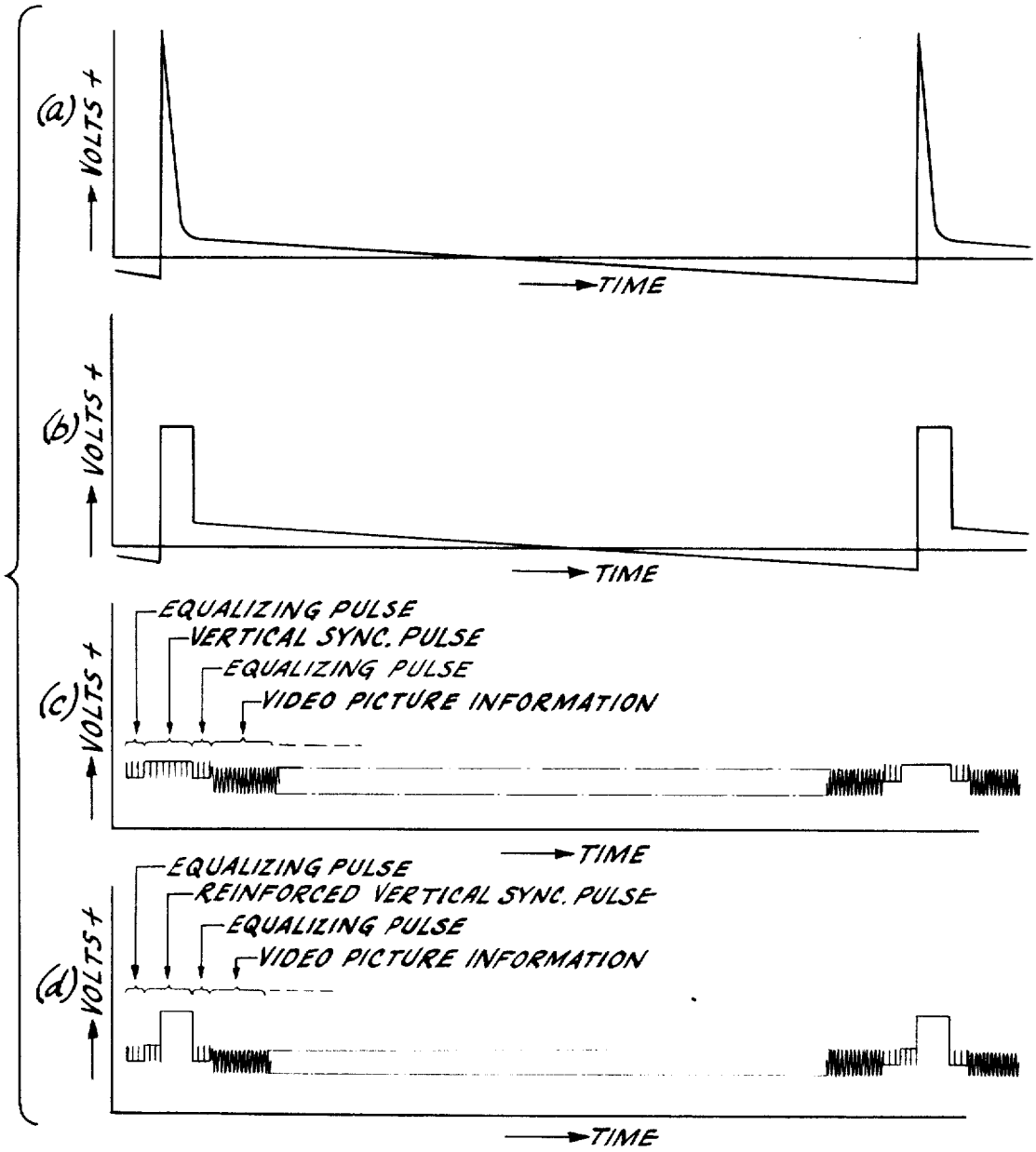
FIGURE 3 are graphs illustrating the waveforms of the signal present in certain portions of the circuit of FIGURE 2 during the operation of the receiver.

Operation of the above-described embodiment is illustrated in FIGURE 3 wherein the retrace pulse waveform appearing at successive portions of the circuit of FIGURE 2 is shown. In FIGURE 3a, a positive retrace pulse derived from the vertical deflection circuit is illustrated. FIGURE 3b illustrates the collector voltage pulse that is applied to the control grid 54 of the second video amplifier 20 during the retrace time interval. FIGURE 3c illustrates the vertical sync pulse portion of the composite video signal applied to the control grid 54 of the second video amplifier 20; and FIGURE 3d shows the vertical sync pulse portion of the composite video signal as enhanced by the addition of the collector voltage pulse. As can be seen by comparing FIGURES 3c and 3d there is a slight time delay between the start of the vertical sync pulse portion of the composite video signal and the time in which the sync pulse is enhanced. The delay is of the order of 0.18 millisecond and is inherently due to the manner in which the retrace pulse is derived in the vertical deflection circuit. However, this delay in no way affects the utility and operation of the invention, since for reasons well understood in the art, vertical retrace does not occur within 0.18 millisecond of the start of the vertical sync pulse portion of the composite video signal.

Figure 4:
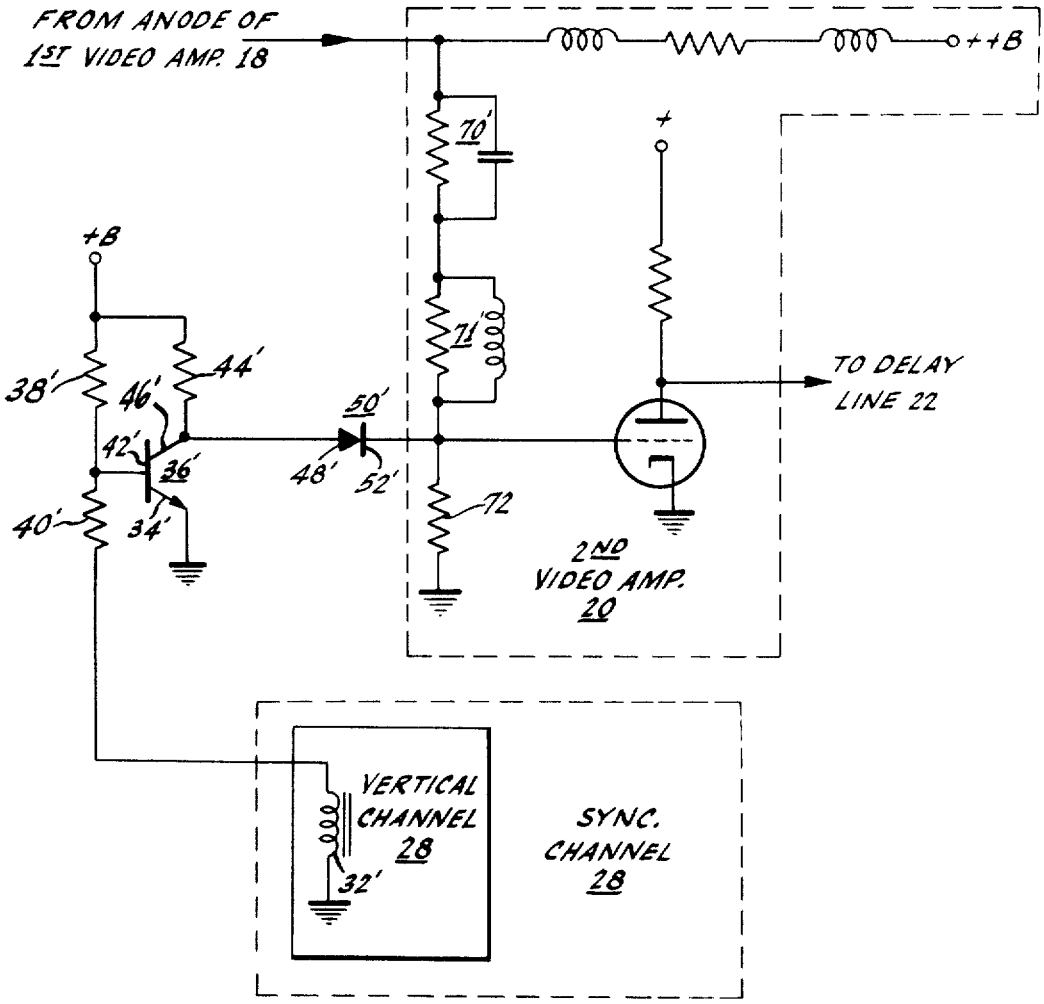
FIGURE 4 illustrates schematically the circuit details of another embodiment of the present invention as applied to the receiver shown in FIGURE 1.

In the above-described embodiment, the retrace pulse derived from the vertical deflection circuit is assumed to be positive going with respect to ground or zero potential. However, if the derived pulse is negative going with respect to ground, the circuit configuration would be similar to that previously described except that the negative pulse would be supplied through a resistor to the base electrode of the transistor, and the emitter electrode would be returned directly to ground. The negative pulse would then drive the transistor 36 into cutoff and the circuit would operate as described above. An embodiment of the invention utilizing a negative retrace pulse is shown in FIGURE 4. Except as above noted, the circuit of FIGURE 4 is identical to that of FIGURE 2 and the circuit operation is correspondingly the same.

A particular set of values of the circuit arrangement of FIGURE 2 which has provided satisfactory operation is set forth below. It will be appreciated that these values are given by way of example only:

| | | |
|---|---|---|
| Resistor **38** | ohms | 18,000 |
| Resistor **40** | do | 2,700 |
| Resistor **44** | do | 5,600 |
| Resistor **72** | do | 27,000 |
| Network **70**: | | |
| $R_1$ | ohms | 47,000 |
| C | picofarads | 3.5 |
| Network **71**: | | |
| $R_2$ | ohms | 10,000 |
| L | microhenries | 330 |
| Diode **50** | | 1N3070 |
| Transistor **36** | | 2N3565 |
| Supply voltage +B | volts DC | 15 |
| Supply voltage ++B | volts DC | 405 |

What is claimed is:

1. In a television receiver having a video amplifier and vertical deflection waveform generating apparatus for producing a deflection waveform having a relatively long scanning portion and a relatively short retrace portion:

means coupling to said generating apparatus for deriving a pulse signal during the retrace portion;

a pulse amplifier biased to a normally conductive state;

means coupling said pulse signal to the input of said pulse amplifier to render said amplifier nonconductive during an interval substantially coincident with the retrace portion of said deflection waveform; and diode means serially connected between the output of said pulse amplifier and the input of said video amplifier, said diode means biased to present a high impedance to the output of said pulse amplifier during an interval substantially coincident with the scanning portion of said deflection waveform, and a low impedance to the output of said pulse amplifier during an interval substantially coincident with the retrace portion of said deflection waveform.

2. In a television receiver;

vertical deflection waveform generating apparatus for providing a deflection waveform having a relatively long scanning portion and a relatively short retrace portion;

means coupled to said generating apparatus for deriving a pulse signal during the retrace portion;

a positively biased amplifier responsive to a video signal;

a pulse amplifier biased to a normally conductive state;

means coupling said pulse signal to the input of said pulse amplifier to render said amplifier non-conductive during an interval substantially coincident with the retrace portion of said deflection waveform; and diode means serially connected between the output of said pulse amplifier and the input of said video amplifier, said diode means biased to present a high impedance to the output of said pulse amplifier during an interval substantially coincident with the scanning portion of said deflection waveform, and a low impedance to the output of said pulse amplifier during an interval substantially coincident with the retrace portions of said deflection waveform.

3. In a television receiver having a video amplifier and vertical deflection waveform generating apparatus for producing a deflection waveform having a relatively long scanning portion and a relatively short retrace portion, said generating apparatus including a transformer having a winding across which is developed a pulse signal substantially coincident in time with the retrace portion of the deflection waveform, the combination of:

a pulse amplifier having input and output circuits;

means for applying a biasing potential to said pulse amplifier to render it normally conductive;

means coupling said pulse signal to the input circuit of said pulse amplifier to render said amplifier non-conductive only during a time interval substantially coincident with the retrace portion of the vertical deflection waveform; and diode means serially connected between the output circuit of said pulse amplifier and the input circuit of said video amplifier for providing a non-conductive path between said amplifiers during the scanning portion of the vertical deflection waveform and a conductive path between said amplifiers during the time interval substantially coincident with the retrace portion of the vertical deflection waveform.

*4. In a television receiver comprising a cathode ray tube, a deflection system for sweeping a cathode ray beam having trace and retrace intervals, a source of video signals, and a beam blanking circuit including the combination of: a video amplifier coupling the source of video signals to the cathode ray tube, switching means coupled to said video amplifier and adapted to be switched between different conductive states, said deflection system furnishing a deflection signal, a network coupling said deflection system to said switching means and responsive to said deflection signal to provide gating pulses, a gating pulse greater in amplitude than a predetermined level driving said switching means into one of said conductive states, said gating pulse being greater than said predetermined level for a retrace interval, said video amplifier being responsive to said one conductive state to develop a blanking pulse poled to cutoff said cathode ray tube for said retrace interval.*

*5. The beam blanking circuit according to claim 4, the output portion of said switching means comprising a transistor having a control electrode and an output electrode, said network coupled to said control electrode, said output electrode coupled to said video amplifier, said one conductive state being cut off, means for biasing said transistor into conduction during the absence of said gating pulses, each of said gating pulses having a duration sufficient to cut off said transistor during said retrace interval.*

*6. In a television receiver comprising a cathode ray tube, a deflection system for sweeping a cathode ray beam having trace and retrace intervals, a source of video signals, and a beam blanking circuit including the combination of: means including a video amplifier coupling the source of video signals to the cathode ray tube, switching means coupled to said video amplifier and adapted to be switched between different conductive states, said deflection system furnishing a deflection signal, circuit means coupling said deflection system to said switching means and responsive to said deflection signal to provide gating pulses, a gating pulse greater in amplitude than a predetermined level driving said switching means into one of said conductive states, said gating pulse being greater than said predetermined level for a retrace interval, said video amplifier being responsive to said one conductive state to develop a blanking pulse poled to cut off said cathode ray tube for said retrace interval.*

*7. The beam blanking circuit according to claim 6, the output portion of said switching means comprising a transistor having a control electrode and an output electrode, said circuit means coupled to said control electrode, said output electrode coupled to said video amplifier, said one conductive state being cut off, means for biasing said transistor into conduction during the absence of said gating pulses, each of said gating pulses having a duration*

*sufficient to cut off said transistor during said retrace interval.*

References Cited

The following references, cited by the Examiner, are of record in the patented file of this patent or the original patent.

UNITED STATES PATENTS 2,950,346 8/1960 Freedman et al. --- 178—7.5 R 3,090,889 5/1963 Levinson ---------- 315—22
3,247,418 4/1966 Hansen et al. ------ 315—22 X ROBERT L. RICHARDSON, Primary Examiner U.S. Cl. X.R.

178—7.3 R; 315—22